(12) United States Patent
Costa et al.

(10) Patent No.: US 7,540,966 B2
(45) Date of Patent: *Jun. 2, 2009

(54) METHOD AND APPARATUS FOR PURIFYING WATER

(75) Inventors: Alvin Costa, Tiverton, RI (US); Richard T. Coffey, Pompano Beach, FL (US); Michael Pereira, Smithfield, RI (US); Daniel Nelsen, Providence, RI (US); Thomas Parent, Providence, RI (US); Christopher Kampf, Cranston, RI (US)

(73) Assignee: Zodiac Pool Care, Inc., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/953,371

(22) Filed: Dec. 10, 2007

(65) Prior Publication Data

US 2008/0128363 A1 Jun. 5, 2008

Related U.S. Application Data (63) Continuation of application No. 11/485,096, filed on Jul. 12, 2006, now Pat. No. 7,320,761, which is a continuation of application No. 11/252,106, filed on Oct. 17, 2005, now abandoned, and a continuation of application No. 11/040,438, filed on Jan. 21, 2005, now Pat. No. 7,147,786, which is a continuation of application No. 10/414,598, filed on Apr. 16, 2003, now Pat. No. 6,982,040.

(51) Int. Cl.
*C02F 1/50* (2006.01)
*C02F 1/76* (2006.01)

(52) U.S. Cl. .............. 210/752; 210/753; 210/754; 210/764; 210/167.11; 210/192; 210/199; 210/205; 210/232; 422/37; 422/261; 422/282

(58) Field of Classification Search .............. 210/752
See application file for complete search history.

(56) References Cited

U.S. PATENT DOCUMENTS 4,263,114 A 4/1981 Shindell (Continued)

FOREIGN PATENT DOCUMENTS

AU 718005 7/2000

(Continued)

OTHER PUBLICATIONS

Patent Abstracts of Japan, vol. 2002, No. 02, Apr. 2, 2002 and JP 2001 276828 A (Miyazaki, Tomoyoshi; Miyazaki Akiko) Oct. 9, 2001 Abstract.

(Continued)

*Primary Examiner*—Peter A Hruskoci
(74) *Attorney, Agent, or Firm*—Dean W. Russell; Kilpatrick Stockton LLP (57) ABSTRACT

The invention relates to a method for purifying water by dissolving one or more soluble metal salts in the water to provide corresponding metal ions, by dissolving hypohalite into the water, and by regulating the residence time, and thus hypohalite concentration in the device using a venturi nozzle disposed between the metal generator and the hypohalite generator.

24 Claims, 3 Drawing Sheets

U.S. PATENT DOCUMENTS

| | | | |
|---|---|---|---|
| 4,328,084 A | 5/1982 | Shindell |
| 4,364,814 A | 12/1982 | Langley |
| 4,422,219 A | 12/1983 | Kepiro |
| 4,451,341 A | 5/1984 | Miller |
| 4,680,114 A | 7/1987 | Hayes |
| 4,701,265 A | 10/1987 | Carlsson et al. |
| 4,781,805 A | 11/1988 | Dahlgren |
| 4,808,290 A | 2/1989 | Hilbig |
| 4,936,979 A | 6/1990 | Brown |
| 4,992,156 A | 2/1991 | Silveri |
| 5,076,315 A | 12/1991 | King |
| 5,328,584 A | 7/1994 | Erickson et al. |
| 5,746,923 A | 5/1998 | Forward |
| 5,772,896 A | 6/1998 | Denkewicz, Jr. et al. |
| 5,792,369 A | 8/1998 | Johnson |
| 5,935,609 A | 8/1999 | Denkewicz, Jr. et al. |
| 5,993,669 A | 11/1999 | Fulmer |
| 5,993,753 A | 11/1999 | Davidson |
| 6,007,693 A | 12/1999 | Silveri |
| 6,039,883 A | 3/2000 | Milde et al. |
| 6,093,422 A | 7/2000 | Senderov et al. |
| 6,132,627 A | 10/2000 | Joko et al. |
| 6,190,547 B1 | 2/2001 | King |
| 6,197,195 B1 | 3/2001 | Booth et al. |
| 6,207,060 B1 | 3/2001 | McKa |
| 6,210,566 B1 | 4/2001 | King |
| 6,221,321 B1 | 4/2001 | Fleischer et al. |
| 6,224,744 B1 | 5/2001 | Casado Gimenez et al. |
| 6,224,779 B1 | 5/2001 | Spector |
| 6,238,546 B1 | 5/2001 | Knieper et al. |
| 6,254,788 B1 | 7/2001 | Davidson |
| 6,254,894 B1 | 7/2001 | Denkewicz, Jr. et al. |
| 6,287,450 B1 | 9/2001 | Hradil |
| 6,287,462 B1 | 9/2001 | Likos |
| 6,350,385 B1 | 2/2002 | Holt et al. |
| 6,508,929 B1 | 1/2003 | Mercer |
| 6,524,475 B1 | 2/2003 | Herrington et al. |
| 6,551,518 B2 | 4/2003 | Gargas |
| 6,761,827 B2 | 7/2004 | Coffey |
| 6,814,095 B2 | 11/2004 | King |
| 6,982,040 B2 | 1/2006 | Costa et al. |
| 7,147,786 B2 | 12/2006 | Costa et al. |
| 7,238,278 B2 | 7/2007 | Coffey et al. |
| 7,320,761 B2 | 1/2008 | Costa et al. |
| 2002/0189954 A1 | 12/2002 | Miyazaki et al. |
| 2005/0039795 A1 | 2/2005 | King |
| 2006/0032803 A1 | 2/2006 | Costa et al. |

FOREIGN PATENT DOCUMENTS

| | | |
|---|---|---|
| DE | 36 29 010 A | 3/1988 |
| EP | 0 834 472 A2 | 4/1998 |
| EP | 0 834 472 A3 | 4/1998 |
| GB | 1 310 764 A | 3/1973 |
| GB | 2 348 945 A | 10/2000 |
| WO | WO 97/37939 | 10/1997 |
| WO | WO 99/44949 | 9/1999 |
| WO | WO 03/040038 A2 | 5/2003 |
| ZA | 97/2867 | 3/1999 |

OTHER PUBLICATIONS

Fifth Edition *Chemical Engineers' Handbook*, Robert H. Perry/Cecil H. Chilton (published by McGraw-Hill Book Company), Section 5 Fluid and Particle Mechanics, pp. 5-10 thru 5-15, (copyright 1973).
International Search Report in related PCT/US02/34491.

METHOD AND APPARATUS FOR PURIFYING WATER

CROSS REFERENCE TO RELATED APPLICATIONS

This application is a continuation of U.S. patent application Ser. No. 11/485,096 filed on Jul. 12, 2006 and issued as U.S. Pat. No. 7,320,761, which is a continuation of U.S. patent application Ser. No. 11/252,106, filed on Oct. 17, 2005 (now abandoned), and U.S. patent application Ser. No. 11/040,438, filed Jan. 21, 2005, and issued as U.S. Pat. No. 7,147,786, both of which are continuations of U.S. application Ser. No. 10/414,598, filed Apr. 16, 2003, now U.S. Pat. No. 6,982,040. The contents of all of the applications identified above are incorporated herein in their entireties by this reference.

BACKGROUND OF THE INVENTION

1. Field of the Invention

This invention relates to the methods and apparatus for purifying and sanitizing water using a combination of halogenation and introduction of microbiocidal metal species into the water. More particularly, the invention relates to the systems and methods for combining purification by chlorination and the introduction of biocidal metal ions into the water using a single purification unit that is easier to install, operate, and maintain than are existing systems.

2. Description of Related Art

Purification of water by chlorination has been carried out for some time. The introduction into water, in particular pool water, of compounds that dissolve or hydrolyze to form hypohalic acid, hypohalite ions, or both have known utility in disinfecting the water (and whose use is typically known as "chlorinating" the water). Chlorination is widely used to protect swimmers and bathers in swimming pools, hot tubs, spas, and the like. It is a relatively safe, effective, and reliable method of water purification, and is familiar to many pool owners.

However, effective use of chlorination requires a rather high level of skill and involvement on the part of the pool or spa owner. The water chemistry must be carefully monitored and adjusted to maintain appropriate chlorine levels. Because the amount of hypochlorite ion in the water degrades over time, the chlorine levels must be constantly replenished by addition of fresh chlorination chemicals. This requires that the pool owner frequently monitor chlorination levels and frequently handle, measure, and add chlorination chemicals. Lack of adequate care or insufficient skill in handling these chemicals can lead to an over- or under-chlorinated pool.

Highly chlorinated pool water is often uncomfortable to, and is thought to possibly have adverse effects on the health of, swimmers and bathers, decreases the useful life of swimwear, etc. For example, overly chlorinated water can cause burning sensations in the eyes and other mucus membranes, and is associated with a characteristic odor that some find unpleasant. On the other hand, insufficient chlorine levels can allow the growth of pathogenic and nonpathogenic organisms to occur, which can create health risks and poor pool appearance.

In addition, hypochlorite generating chemicals are strong oxidizers, which can cause burns to human skin if not handled properly. It is also possible that exposure to aqueous hypochlorite generating chemicals can cause metal parts to corrode more quickly.

For all of these reasons, alternatives to chlorination, or at least purification techniques the decrease the amount of chlorination that must be used, have long been sought. The introduction of microbiocidal metals into water to sanitize it has also been suggested for and used in various water purification applications, such as in pools and spas. In particular, various methods of introducing metal ions, such as silver ions or copper ions, into the water have been proposed. The use of these ions to purify, e.g., pool water, results in decreased need for chlorination. One method of introducing such ions into water that has been proposed involves the use of sacrificial electrodes containing metals corresponding to the desired ions, including alloys of silver and copper, and electrolytically dissolving the metals into the water. Other methods include contacting the water with substrates that have been coated or impregnated with metal, soluble metal salts, or some combination thereof. These methods can be difficult for pool owners to control, and as a result, can sometimes provide unreliable control of metal delivery, and can cause stained surfaces when too much metal has been delivered, or result in insufficient sanitation when too little metal has been delivered.

There remains a need in the art for a water purification system that provides the benefits of both metal ion purification and chlorination techniques, that is easy to install, maintain, and operate, that provides automatic control of chlorine levels in the pool, and that requires less handling of chlorinating chemicals by the pool owner.

SUMMARY OF THE INVENTION

This invention results from the combination of techniques for the introduction of microbiocidal metals with the introduction of chlorinating chemicals that uses a single device to dispense both materials into the water in an automated fashion, to provide a purification system and method that is safe, effective, economical, and easy to use.

The use of a single device simplifies installation and maintenance, since only a single vessel need be plumbed in and monitored.

The combination of microbiocidal metals with chlorination allows decreased levels of metal ion to be present, along with decreased chlorine levels. As a result, there is decreased likelihood of unpleasant or unhealthy side effects from either technique, such as staining of pool surfaces, chlorine damage to hair and clothing of swimmers and bathers, reduced opportunity to produce chloramines, etc. At the same time, the pool water is sanitized for a wide variety of microorganisms by the use of multiple methods. In addition, the design of the system allows for the use of readily available tablets of hypochlorite producing chemicals and automatic dispensing of appropriate amounts of chlorine to the water. This results in decreased need for handling of oxidizing chemicals, and decreased need for monitoring of the pool water.

According to certain embodiments of the invention, purification of a body or stream of water is accomplished via an apparatus that includes a housing having an inlet and an outlet. Water is directed into the inlet, which is in fluid communication with a metal generator, comprising a metal generating chamber containing media that introduces metal concentrations into the water. The media may contain metallic material which dissolves or disperses into the water, or may contain soluble metal salts, or combinations thereof.

At least some of the water flows through or otherwise contacts at least a portion of the media, thereby acquiring some of the metallic material, generally in the form of metal ions. The metal generator may provide a water flow path that directs a portion of the inlet water through the metal generating chamber, where it comes into contact with the metal generating media, and another portion of the inlet water outside the metal generating chamber, so that it does not come into contact with the metal generating media. The metal generator may optionally provide a flow path whereby these two flows are mixed downstream of the media. One embodiment that includes these features contains a cartridge containing the metal generating media, and which is disposed in a housing that supplies water through a manifold, wherein a portion of the water passes through openings in the cartridge, and another portion of the water passes through space between the cartridge and the housing containing the cartridge, but does not substantially contact the media inside the cartridge.

The metal generating chamber is also in fluid communication with halogen generation chamber, and with a venturi nozzle, which is itself in fluid communication with the halogen generation chamber. The halogen generation chamber contains halogen generating salt, e.g., as sodium hypochloride or other salt suitable for "chlorination" of water. At least a portion of the water directed into the inlet and passing through the metal generator can also flow through the halogen generator and contacts the halogen generating salt, thereby introducing halogen into the water. Another portion of the water from the metal generator is directed through the venturi nozzle. This water generally does not flow into the halogen generating chamber, but provides a pressure drop that draws water from the halogen generating chamber into the venturi nozzle, where it combines with the water from the metal generating chamber and exits the device for return to use. The water passing through the halogen generator may be either untreated water from the metal generator (i.e., a metal generating chamber by-pass stream) or may be treated water from the metal generating chamber. In the first instance, the treated water from the metal generating chamber will pass through the venturi nozzle. In the latter instance, the by-pass stream will pass through the venturi nozzle.

In one embodiment, the invention relates to a device for purifying water having an inlet and an outlet, comprising:

a metal generator, having an inlet in fluid communication with the inlet of the device, and a first outlet and a second outlet, and adapted to provide concentrations of one or more metals to the water;

a halogen generator, having an inlet in fluid communication with the first outlet of the metal generator, and having an outlet, and adapted to provide concentrations of halogen to the water;

a venturi nozzle, having an inlet in fluid communication with the second outlet of the metal generator, which is in fluid communication with outlet of the halogen generator, and having an outlet in fluid communication with the outlet of the device.

In another embodiment, the device contains one or more control valves, that can be used to regulate the flow of water into the halogen generator, and thus the flow of water passing through the venturi nozzle. Ensuring that the water flowing into the halogen generator is provided at a point distant from the flow path from the halogen generator to the venturi nozzle maintains adequate contact with halogen generating media and adequate mixing with halogenated water. This helps to ensure a consistent halogen concentration in the water. In the alternative, or in addition to, this control valve, a control valve can be used to directly regulate the flow of water from the halogen generator to the venturi nozzle, by placing this control valve in the flow path between the two.

In another embodiment, the invention relates to the use of a control valve in conjunction with a venturi nozzle to control flow rate of water into a halogen generator. In this embodiment, the presence of a metal generator or metal generating chamber is optional, and can be eliminated. Water flowing into the device is divided into two portions, one of which passes through a control valve and into a halogen generating chamber, while the other portion passes through a venturi nozzle in fluid communication with an outlet of the halogen generating chamber. The pressure drop between the halogen generating chamber and the venturi nozzle (which is regulated by the proportion of inlet water passing through the control valve) draws halogen treated water from the halogen generating chamber into the venturi nozzle. The combination of control valve and venturi nozzle thus controls the halogen concentration of water leaving the device (and returning to the body of water from which it was drawn, if such a return is done).

These and various other embodiments of the invention result in a method and system that achieve the advantages of halogenation and the advantages of microbiocidal metal ion purification, but vastly reduce the concomitant disadvantages of each. Further, the combination of techniques results in a significantly more economical purification process than is achievable with chlorination alone.

BRIEF DESCRIPTION OF THE DRAWINGS

FIG. 1A is a left side view along line L-L of front view FIG. 1B.

DETAILED DESCRIPTION OF SPECIFIC EMBODIMENTS

The methods and apparatus described herein can be used to sanitize and protect water from the growth of microorganisms, such as bacteria, virii, fungi, algae, and the like. This sanitizing and protecting effect can be used for water in a variety of applications, including swimming pools, hot tubs, spas, as well as wastewater treatment facilities, cooling towers, and the like. The description below will focus on applications for swimming pools, hot tubs, spas, and the like. Those familiar with the art of water purification will be able to modify the teachings below to other water treatment applications without the exercise of undue experimentation.

In many cases, the metal introduced into the water will contain silver, copper, or some combination thereof, because of the recognized bactericidal, viricidal, and algaecidal properties of these metals. Other metals, such as zinc, can also be introduced into the water, alone or combined with the metals described above, to provide, e.g., additional biocidal activity. The metals can be introduced as metallic, zero valence material, or as metal ions that can be introduced into the water by dissolution of soluble metal salts, or by the dissolution of the metal itself. For example, silver ion can be introduced into the water through the dissolution of silver nitrate, or through the dissolution of metallic silver as the result of conversion to silver oxide and subsequent conversion of the oxide to more soluble silver species. Copper ion can be introduced into solution through the dissolution of copper sulfate or copper chloride, for example. Mixtures of different salts, or of salts with metallic material, may be combined together to provide the necessary concentration of metal ions in the water.

Similarly, the halogen generating chamber will contain a salt of a hypochlorite, such as an alkali metal hypochlorite, such as sodium hypochlorite. It will be understood, however, that additional or alternative halogen containing materials, such as materials containing bromide, iodide, hypobromite, and the like, or combinations thereof, can be present in the water or in this chamber, and which can provide sanitizing effects to the water being treated.

It will therefore be understood that, throughout this description, the term "pool water" refers to water used in swimming pools, spas, hot tubs, or other uses where purified water is required, unless specifically indicated otherwise. The terms "chlorination" and "hypochlorite" will be understood refer to the use of hypohalite or hypohalic acid, or combinations thereof, purify water. The terms "metal ion" will be understood to refer to any metal cations described above that provide protection against pathogenic or non-pathogenic organisms in water.

One particular material suitable for introducing metal ions into the water is a combination of soluble copper salt and metallic silver, deposited on a substrate, and sold under the name Nature$^2$® by Zodiac Pool Care, Inc.

The chlorinating material introduced into the halogen generating chamber will generally be in the form of a solid, typically a solid salt that will dissolve easily in the water introduced into the chamber. In one embodiment of the invention, the halogen generating chamber is adapted to utilize commercially available hypochlorite salt tablets, which can be stacked in the chamber. This approach is convenient for the pool owner, since it is easy to obtain the hypochlorite salt necessary to replenish the device, and since replenishment need occur less frequently. In another embodiment of the invention, the halogen generating chamber can be adapted to use proprietary hypochlorite salt tablets, e.g., by shaping inner surface of the chamber to match the shape of the tablets. This provides the manufacturer with some control over the type of tablets used, ensuring that the pool owner does not use tablets that are inappropriate for the particular purification use (e.g., ensuring that the pool owner does not use tablets designed for a much smaller or much larger pool, thereby dispensing inappropriate quantities of hypochlorite into the water).

In general, sanitization of a body of water can be accomplished by removing a flow stream from the water, passing this flow stream through the device of the invention, and returning the treated flow stream to the body of water. Over time, and with a discrete body of water, dissolved hypohalite will have been carried by the pump and dispersed throughout the body of water, where it remains active in sanitizing the water. Similarly, microbiocidal metal ions are introduced when the flow stream from the body of water contacts the source for the microbiocidal metal ions in the metal ion generating chamber, and returns through the body of ater. In either case, flow rates and residence times for the removed flow streams are selected so that the water is in contact with the metal ion generating material and or the source of metal ion for a sufficient time to achieve the desired results, i.e., the desired hypochlorite or metal ion concentrations. Alternatively, if a flow stream of water, rather than a body of water, is to be purified, the entire flow stream of water can be processed through the device.

In one embodiment of the device of the invention, water first enters the metal ion generating chamber. At least a portion of this water contacts the metal ion generating material, which releases metal ions into at least a portion of the water. A portion of the water that leaves the metal ion generating chamber then passes into the halogen generating chamber, where it comes into contact with the halogen generating material, such as a solid hypochlorite salt. The water dissolves a portion of this salt, and thereby becomes chlorinated. Another portion of the water leaving the metal ion generating chamber passes through a venturi nozzle that is in fluid communication with both chambers. The flow of water from the metal ion generating chamber creates a pressure drop between the throat or constriction of the venturi nozzle and the halogen generating chamber, thereby drawing treated water from the halogen generating chamber into the venturi nozzle. The treated water from the halogen generating chamber mixes in the venturi nozzle with water exiting the metal ion generating chamber, and exits the device through the outlet, which is in fluid communication with the outlet of the venturi nozzle.

The invention can be more clearly understood by reference to the attached drawings, which are directed to a specific embodiment thereof, and are not intended to limit the claims or to exclude other embodiments of the invention consistent with this specification.

Figure 1:
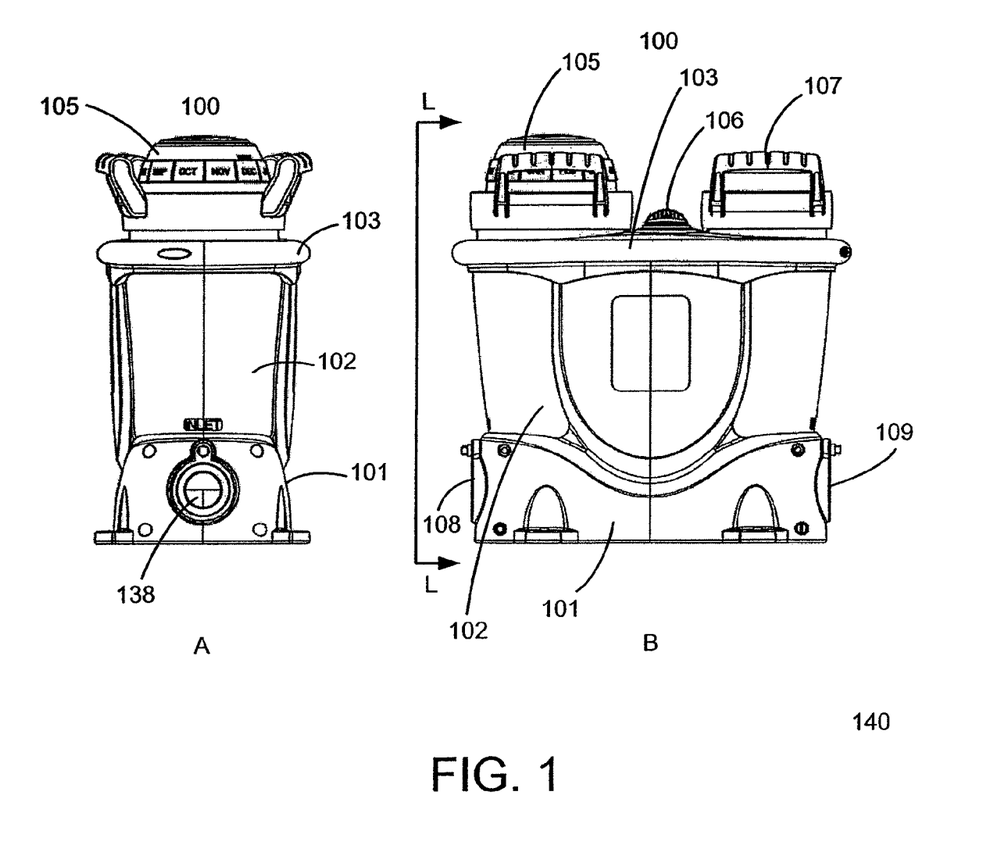
FIG. 1 is a side and front view of one embodiment of a device according to the invention.

FIG. 1 is a left side view (FIG. 1A) and a front view (FIG. 1B) of a water sanitization apparatus 100 according to a particular embodiment of the invention. In these embodiments, the water purification apparatus 100 includes a housing 102 associated with a base 101. Because relatively concentrated hypochlorite solutions will be generated within the housing, the housing is desirably at least primarily constructed of chlorine resistant materials. ABS (Acrylonitrile-Butadiene-Styrene) plastic resin is one such suitable material, but any appropriate chlorine resistant material can be used. The housing material preferably can be either opaque, or polished so as become transparent. The base 101 is optionally detachable from the housing, and has apertures for an inlet 108 and an outlet 109, and preferably, for a pressure relief valve, shown in FIG. 2. The components of the housing are held together at least in part by a clamp 103, comprising a rear portion and a front portion. The clamp provides structural integrity and ease of assembly to the housing 102, and are preferably constructed of a strong, lightweight material such as plastic or aluminum.

Openings in the top of housing 102 are covered by metal ion generating chamber cover 105 and halogen generating chamber cover 107. Control of the amount of chlorine provided to the water is provided by chlorine metering valve control 106

Figure 2:
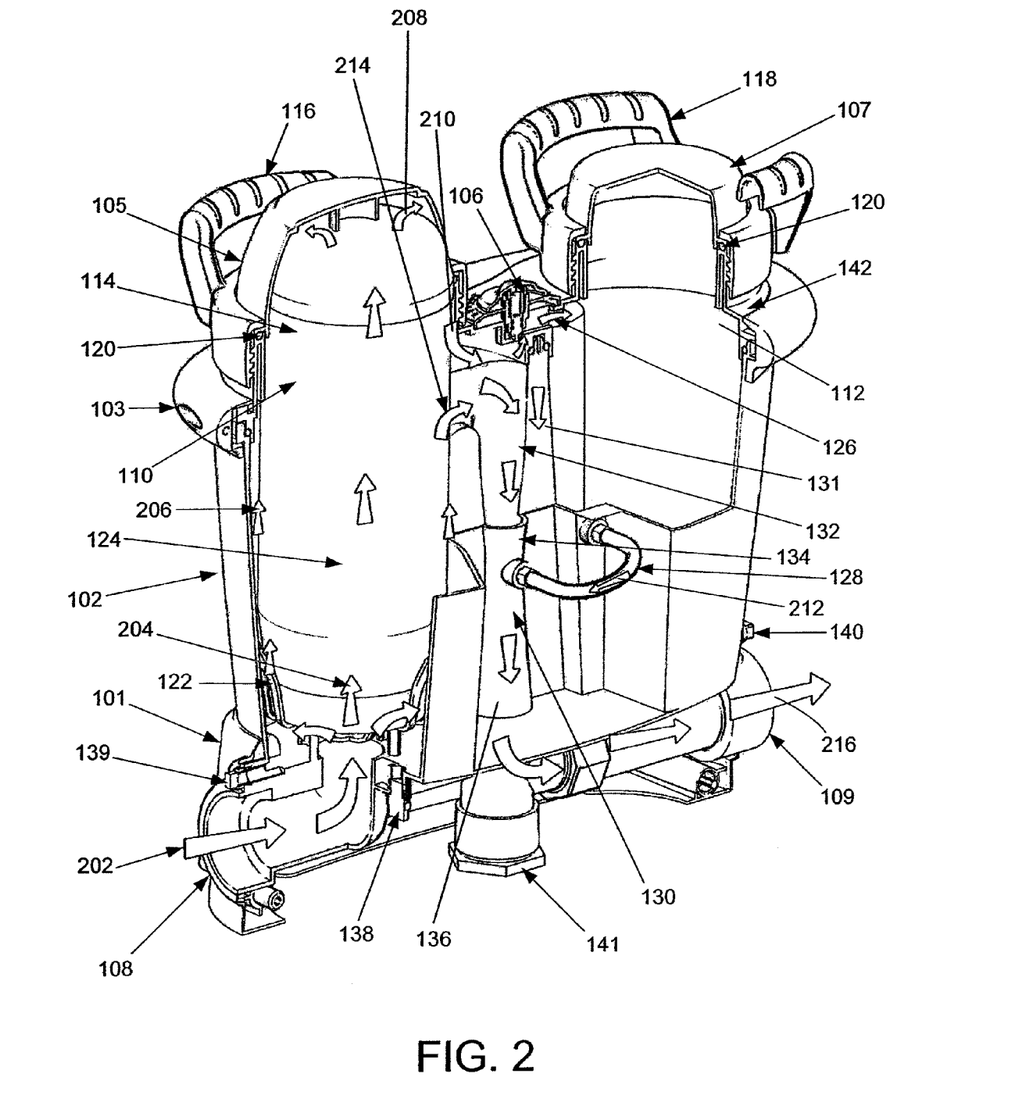
FIG. 2 is a perspective view of the components of the embodiment of the device shown in FIG. 1, cutaway to show internal features of the device and water flow paths.

FIG. 2 is a cutaway perspective view of the components of the water sanitization apparatus according to FIG. 1. The housing 102 includes ports 110, 112 for installing and removing the metal generator 114 and hypochlorite, generally in the form of tablets (not shown). The metal generator port 110 is preferably sealed by a removable metal generator cover 105. The halogen generation chamber port 112 is preferably sealed by a removable cover 107. Both the metal generator cover 105 and the halogen generation chamber port cover 107 may be secured in place by threaded collars 116 and 118, respectively, for ease of removal by the pool owner or servicing personnel, the covers and/or collars may optionally be tethered to the housing 102 to decrease the chance of loss while the apparatus 100 is being serviced. The threaded collars 116 and/or 118 may be equipped with mechanical stops and/or audible tightening indicators to ensure that the collars are positioned correctly. These features ensure that the tightening handles do not obstruct each other or access to the control valve.

To protect the components of the apparatus 100 from environmental contamination, and to prevent leakage of water, the apparatus is sealed. Either or both the metal generator port 110 and the halogen generation chamber port 112 includes a threaded port that couples with a cover in a watertight union that desirably includes a mechanical locking ring, a jacking ring, an o-ring, and a mechanical stop. For example, the metal generator cover 105 is rotated around the threaded end of the metal generator port until the cover 105 overcomes the mechanical locking ring, at which time the metal generator cover 105 is engaged at the appropriate tightness. The non-rotating "jacking" ring is desirably interposed between the cover 105 and the o-ring 120, and applies vertical pressure while preventing the rotating cover 105 from mechanically stressing the o-ring 120. The o-ring 120 is interposed between the jacking ring and the mechanical stop, which is adjacent to the base of the threaded end of the metal generator port 110. Compressing the o-ring 120 creates a seal that prevents water and other materials from escaping or entering the housing 102 through the metal generator port 110. The watertight seal is achieved in the same fashion with respect to the halogen generation chamber port, the o-ring 120, and the cover 107.

The housing may be include a top portion 142 separate from the bottom portion for ease of assembly and servicing, and these portions may also utilize a mechanical locking ring, jacking ring, and/or a housing o-ring to couple together in a water-tight fashion. Preferably, however, the housing top and bottom portions are not easily disengaged after being assembled together.

FIG. 2 also contains open arrows indicating the flow path of water into, through, and out of the device. Water 202 enters the housing 102 via the inlet 108. At least a portion 204 of this water is directed through media contained in the metal generator 114. The metal generator 114 is a container, desirably cylindrical, that includes at least one vent 122 and a media area 124. The bottom (inlet side) of the metal generator 114 rests on or near the bottom of the metal generating chamber. In certain embodiments of the invention, some of the water 206 entering the metal generator 114 is expelled through the vent 122 without passing though the media area 124. The inlet pressure causes the vented water 206 to travel around the metal generator 114, and the non-vented water 204 to pass though the media area 114. Thus, the metal concentrations in the non-vented water 204 are increased by contact with the media in the metal generator 114. After passing through the metal generator 114, the treated water 208 is expelled though slots (not shown) at the top of the metal generator 114, and blends with the vented water 206 that has been channeled around the metal generator 114.

A portion 210 of the treated water 208 flows through valve 106 and is directed to the halogen generating chamber through flow path inlet 126. The flow path outlet, from which water flows into the halogen generating chamber, is disposed at a distance from the inlet of tube 128 (i.e., the outlet from the halogen generating chamber). This ensures that inlet water is forced to flow up through the existing water in the halogen generating chamber, and increases contact with the halogen generating media, thereby preventing fresh untreated water from immediately leaving the chamber. This, in turn, helps to ensure a relatively constant concentration of halogen in the water leaving the halogen generating chamber. One method of providing such a flow path is tube 131, having an inlet at opening 126 and an outlet (not shown) near the bottom of the halogen generating chamber.

Water leaves this outlet and enters the chamber, where it comes into contact with hypohalite, generally hypochlorite, which is generally in solid form, typically in the form of tablets or granules. Water remains in this chamber for a time sufficient to dissolve sufficient hypohalite to provide sanitizing effective amounts of hypohalite to the water. As explained above, the water is forced to flow through and mix with water already in the chamber, and to come into contact with halogen generating media, before exiting the chamber. At steady state, the water level in the halogen generating chamber is at the level of the inlet of tube 128. A portion 212 of the water in the halogen generating chamber is drawn from the chamber through tube 128 by the difference in pressure between the water in the halogen generating chamber and venturi nozzle 130. A portion 214 of untreated water 206 leaving the metal generating chamber passes into the inlet 132 of venturi nozzle 130. The outlet of tube 130 is located approximately at the throat 134 of venturi nozzle 130, where the pressure drop created by water 214 passing through the nozzle 130 is relatively high. In outlet 136 of nozzle 130, the treated water from the halogen generating chamber mixes with the untreated water from the nozzle inlet to form treated outlet water 216. This sanitized water can then be used by, e.g., returning it to a pool or spa.

In the embodiment shown, separate cylindrical chambers are used for metal generation and for halogen introduction, as the circular cross-section of these chambers is better able to withstand the stresses introduced by operating at pressure. In the event that the pressure inside the apparatus increases beyond desirable design limits, the apparatus is provided with a pressure relief valve 138, which allows water to drain from the metal generating chamber, decreasing the pressure in the system until it returns to acceptable levels. The pressure relief valve 138 can be mechanical and/or electrical, and desirably operates when an internal pressure within the apparatus exceeds a preset value ("trigger pressure"). The trigger pressure can be implemented mechanically or electronically, such as with a spring or an activation switch. The pressure relief valve 138 is preferably set to activate, i.e., to open, at the trigger pressure, within an acceptable tolerance (e.g., $50^{+/-}10$ psi). In addition, drainage plugs 139 and 140 provide for ease of draining the device, if desired, for shut down, winterization, replacement of halogen or metal sources, or should servicing be necessary. Assembly plug 141 closes an opening resulting from the molding process, and has no effect on operation of the device.

An advantage of the various embodiments of the water sanitation apparatus 100 is its ease of installation and maintenance. The housing 102 is compact, allowing for installation in space restricted areas. The installer couples the apparatus 100 with the source of the water to be treated by connecting a suitable water carrying conduit, such as a 2" PVC (polyvinyl chloride) pipe, to the inlet 108. The inlet conduit is further connected to the source of the water to be sanitized. The installer then connects a second conduit to the outlet 109, for allowing egress of sanitized water.

The operator can also easily install or replace metal generator 114 and replenish the hypochlorite generating material. To do so, the operator simply loosens the appropriate cover 105, and disengages the cartridge 114. A new cartridge is engaged, and the cover is retightened. Similarly, the operator can simply loosen and disengage cover 107 and add hypochlorite tablets as necessary, and reengage cover 107.

The design of the apparatus of the invention allows a single valve 106, which can be any suitable valve type, particularly a needle valve, to control the amount of chlorination received by the water. This occurs both by regulating the flow rate into the halogen generating chamber, but also by regulating the volume of water that does not flow into the halogen generating chamber, and therefore passes through the venturi nozzle.

Figure 3:
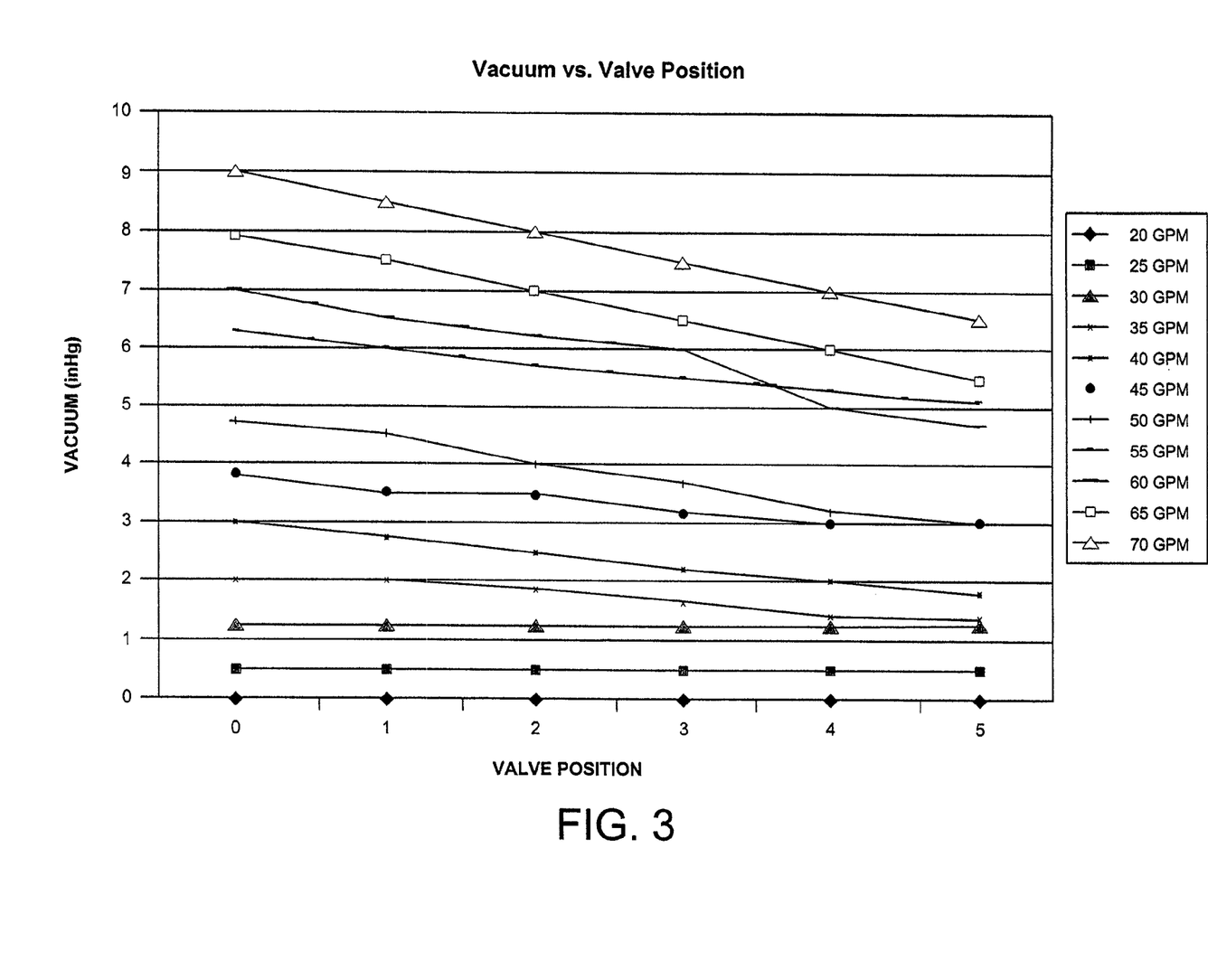
FIG. 3 is a graph showing vacuum drawn by the venturi nozzle in one embodiment of the apparatus of the invention as a function of valve position, for various flow rates of water through the apparatus.

This, in turn, regulates the pressure drop between the halogen generating chamber and the venturi nozzle FIG. 3 provides a graph of vacuum drawn by the venturi nozzle as a function of valve position for various flow rates of water through one embodiment of the apparatus. The graph shows that, as the valve approaches a "closed" position (position 0), the vacuum increases as more water is forced through the venturi nozzle. As the valve is opened (valve position increases), the vacuum decreases in an approximately linear fashion for almost all of the flow rates tested. This predictability provides easy and predictable control of the residence time of water in the halogen generating chamber, and thus provides a very precise control of the hypohalite concentration in the effluent water.

The foregoing description of various aspects, features, and embodiments of the invention has been presented only for the purpose of illustration and description and is not intended to be exhaustive or to limit the invention to the precise forms disclosed. Many modifications and variations are possible in light of the above teaching. For example, it should be understood that although the present invention has been described primarily with water flowing through the metal generator and then through the halogen generating chamber, the principles of the invention can be implemented conversely. The materials used for each element of the water sanitization apparatus are limited only by the mechanical, electrical, and chemical properties of the materials. Although particular shapes, sizes and configurations are disclosed, many other shapes, sizes, and configurations are possible without departing from the scope and spirit of the invention.

The invention claimed is:

1. An apparatus for purifying water, comprising:
   an inlet and an outlet;
   a metal generator, having an inlet in fluid communication with the inlet of the device, and a first outlet and a second outlet, and adapted to provide concentrations of a metal to the water;
   a halogen generator, having an inlet in fluid communication with the first outlet of the metal generator, and having an outlet, and adapted to provide concentrations of halogen to the water, wherein the halogen in the water is selected from the group consisting of bromide, iodide, hypobromite, and mixtures thereof;
   a venturi nozzle, having an inlet in fluid communication with the second outlet of the metal generator, which is in fluid communication with the outlet of the halogen generator, and having an outlet in fluid communication with the outlet of the device.

2. The apparatus of claim 1, wherein the halogen comprises bromide.

3. The apparatus of claim 1, wherein the metal comprises one or more metal ions selected from the group consisting of silver ions, copper ions, zinc ions, and mixtures thereof.

4. The apparatus of claim 1, wherein the metal comprises silver ions and zinc ions.

5. A water purifying system, comprising:
   (a) an inlet for entry of water into the system;
   (b) a metal-generating media adapted to contact at least a portion of the water in the system and provide concentrations of a metal to the water;
   (c) a halogen-generating media adapted to contact at least a portion of the water in the system and provide concentrations of one or more halogens to at least a portion of the water, wherein the metal-generating media and the halogen-generating media are in fluid communication with one another, wherein the halogen is selected from the group consisting of bromide, iodide, hypobromite, and mixtures thereof;
   (d) a flow path between (b) and (c) that is adapted to:
      (1) carry at least a portion of the water in the system;
      (2) create a pressure drop; and
      (3) draw water from the halogen-generating media into the flow path; and
   (e) an exit outlet in fluid communication with the flow path, the exit outlet adapted to allow water to exit the water purifying system, whereby at least a portion of the water exiting the system is purified.

6. The system of claim 5, wherein the halogen comprises bromide.

7. The system of claim 5, wherein the metal comprises one or more metal ions selected from the group consisting of silver ions, copper ions, zinc ions, and mixtures thereof.

8. The system of claim 5, wherein the metal comprises silver ions and zinc ions.

9. A method for purifying water comprising the steps of:
   (a) providing a water purifying system comprising:
      (1) an inlet for entry of water;
      (2) a metal-generating media adapted to contact at least a portion of the water in a system and provide concentrations of a metal to the water; and
      (3) a halogen-generating media adapted to contact at least a portion of the water in the system and provide concentrations of one or more halogens to at least a portion of the water, wherein the metal-generating media and the halogen-generating media are in fluid communication with one another, wherein the halogen is selected from the group consisting of bromide, iodide, hypobromite, and mixtures thereof;
   (b) providing a flow path between (2) and (3);
   (c) carrying at least a portion of water through the system via the flow path;
   (d) creating a pressure drop; and
   (e) drawing water from the halogen-generating media into the flow path, wherein an exit outlet is in fluid communication with the flow path, the exit outlet adapted to allow water to exit the water purifying system, whereby at least a portion of the water exiting the system is purified.

10. The method of claim 9, wherein the halogen comprises bromide.

11. The method of claim 9, wherein the metal comprises one or more metal ions selected from the group consisting of silver ions, copper ions, zinc ions, and mixtures thereof.

12. The method of claim 9, wherein the metal comprises silver ions and zinc ions.

13. A method for purifying water in a system adapted to receive water comprising the steps of:
   providing water to the system;
   providing a metal generator in communication with the water;
   directing at least a portion of the water into a metal generator;
   providing a halogen generator in communication with the water and the metal generator, wherein the halogen is selected from the group consisting of bromide, iodide, hypobromite, and mixtures thereof;
   directing at least a portion of the water into a halogen generator;
   directing at least a portion of the water into a flow path adapted to create a pressure drop to move water from the metal generator or halogen generator into the flow path; and
   directing at least a portion of the water out of the system.

14. The method of claim 13, wherein the halogen comprises bromide.

15. The apparatus of claim 13, wherein the metal comprises one or more metal ions selected from the group consisting of silver ions, copper ions, zinc ions, and mixtures thereof.

16. The apparatus of claim 13, wherein the metal comprises silver ions and zinc ions.

17. An apparatus for purifying water, comprising:
   an inlet and a outlet for the apparatus;
   a metal generating chamber comprising a metal generating chamber inlet in fluid communication with the apparatus inlet, and a first metal generating chamber outlet and a second metal generating chamber outlet, said metal generating chamber adapted to provide concentrations of a metal to water to be purified;
   a halogen generating chamber comprising a halogen generating chamber inlet in communication with the first outlet of the metal generating chamber, said halogen generating chamber further comprising a halogen generating chamber outlet, said halogen generating chamber adapted to provide concentrations of halogen to the water to be purified;
   a venturi nozzle comprising an inlet in fluid communication with the second outlet of the metal generating chamber, said metal generating chamber in fluid communication with the outlet of the halogen generating chamber, said venturi nozzle in fluid communication with the apparatus outlet;
   a housing surrounding the metal generating chamber and the halogen generating chamber;
   a port in the housing adjacent to the metal generating chamber and
   a port in the housing adjacent to the halogen generating chamber.

18. The apparatus of claim 17, wherein the housing comprises chlorine resistant material.

19. The apparatus of claim 18, wherein the housing material comprises Acrylonitrile-Butadiene-Styrene plastic resin.

20. The apparatus of claim 17, wherein the halogen generating chamber comprises a chamber shaped to accept commercially available hypochiorite salt tablets.

21. The apparatus of claim 17, wherein the halogen generating chamber comprises a chamber shaped to accept proprietary hypochiorite salt tablets to ensure proper hypochiorite dispensing level.

22. The apparatus of claim 17, wherein the metal generating chamber port comprises a threaded port coupled to a cover in a watertight union comprising a mechanical locking ring, a jacking ring, an o-ring, and a mechanical stop.

23. The apparatus of claim 17, wherein the halogen generating chamber port comprises a threaded port coupled to a cover in a watertight union comprising a mechanical locking ring, a jacking ring, an o-ring, and a mechanical stop.

24. The apparatus of claim 17, wherein the housing comprises a top portion coupled to a bottom portion in a watertight union comprising a mechanical locking ring, a jacking ring, and an o-ring.

* * * * *

UNITED STATES PATENT AND TRADEMARK OFFICE
CERTIFICATE OF CORRECTION

PATENT NO. : 7,540,966 B2  
APPLICATION NO. : 11/953371  
DATED : June 2, 2009  
INVENTOR(S) : Alvin Costa et al.

Page 1 of 1

It is certified that error appears in the above-identified patent and that said Letters Patent is hereby corrected as shown below:

IN THE CLAIMS:

In Column 12, line 11: Change "hypochiorite" to --hypochlorite--.

In Column 12, line 14: Change "hypochiorite salt tablets to ensure proper hypochiorite" to --hypochlorite salt tablets to ensure proper hypochlorite--.

Signed and Sealed this  
Twentieth Day of March, 2012

David J. Kappos  
*Director of the United States Patent and Trademark Office*